United States Patent [19]

O'Rourke

[11] Patent Number: 6,022,058
[45] Date of Patent: Feb. 8, 2000

[54] VIBRATING CAT LITTER SCOOP

[76] Inventor: Anthony O'Rourke, 23852 Pacific Coast, Hwy., #201, Malibu, Calif. 90265

[21] Appl. No.: 09/082,411

[22] Filed: May 20, 1998

Related U.S. Application Data

[60] Provisional application No. 60/047,285, May 21, 1997.

[51] Int. Cl.[7] .............................. A01K 29/00; B07B 1/02
[52] U.S. Cl. ........................ 294/1.3; 209/418; 294/55; 294/59
[58] Field of Search .................... 294/1.1, 1.3–1.5, 294/7–10, 26.5, 49, 51, 55, 59; 15/257.1, 257.3, DIG. 1; 209/235, 332, 417–420, 920; 221/200; 222/161; 172/40; D7/691, 692; D8/10; D30/161, 162

[56] References Cited

U.S. PATENT DOCUMENTS

| | | | |
|---|---|---|---|
| D. 347,497 | 5/1994 | VanSkiver | 294/1.3 X |
| 3,976,564 | 8/1976 | Holder | 209/417 X |
| 4,121,779 | 10/1978 | Mills et al. | 209/417 X |
| 5,076,627 | 12/1991 | Simon | 294/1.3 |
| 5,622,266 | 4/1997 | Curtis | 209/420 X |

*Primary Examiner*—Johnny D. Cherry
*Attorney, Agent, or Firm*—Lyon & Lyon LLP

[57] ABSTRACT

A cat litter scoop with a battery powered vibrator carried in the scoop handle which is actuated by a thumb operated switch. Upon actuation, the vibrator imparts a high speed oscillatory movement to the scoop about the longitudinal axis of the handle to accelerate the manual steps of insertion, pushing, lifting and sifting associated with the scooping motion employed with a standard cat litter scoop. The scoop portion of the cat litter scoop is provided with a pair of spaced transversely extending rows of elongated longitudinal slots so as to define a solid web portion extending between the rows of slots and transversing the scoop to enhance the structural integrity of the scoop portion of the litter scoop.

4 Claims, 2 Drawing Sheets

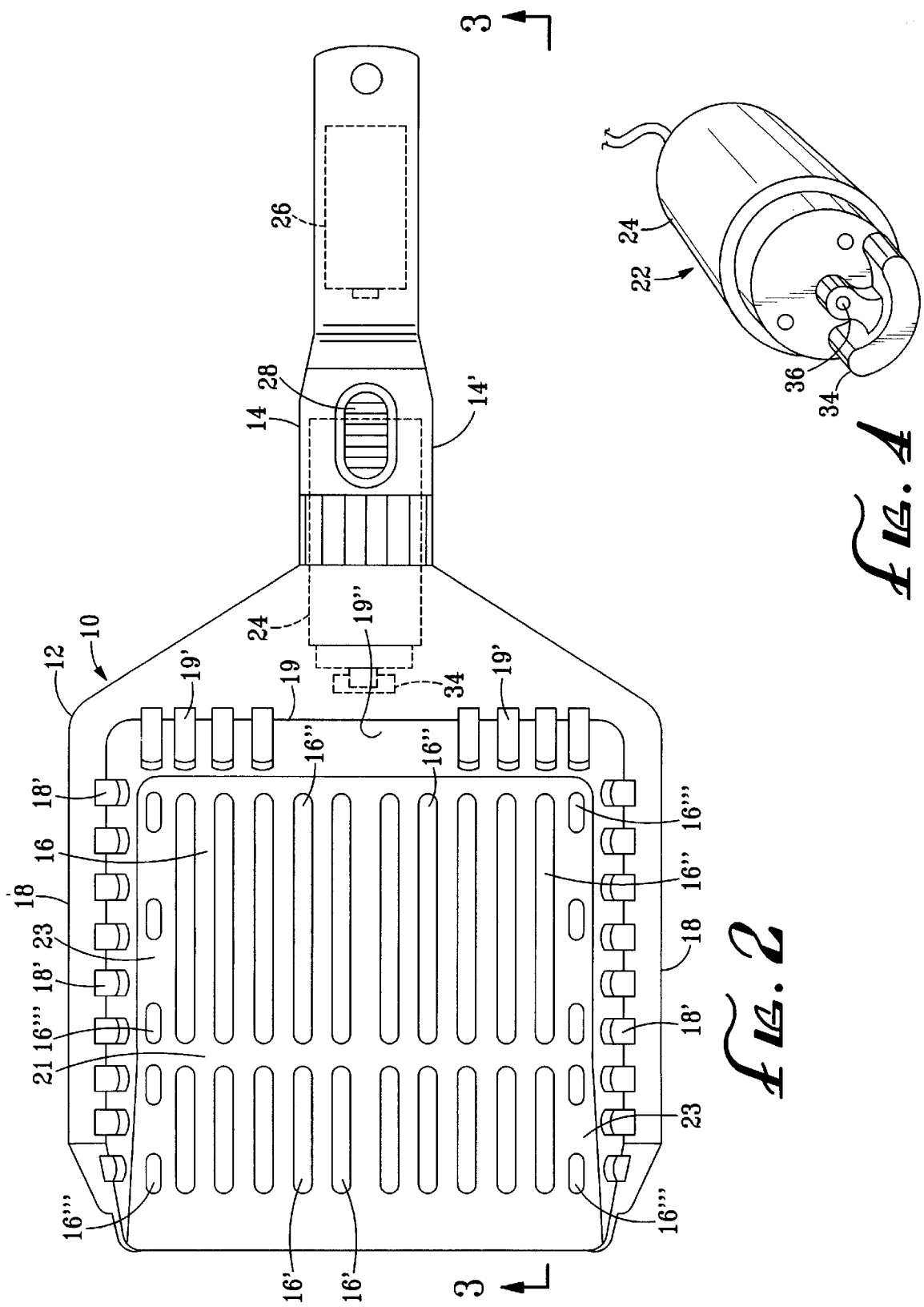

VIBRATING CAT LITTER SCOOP

This application claims the benefit of U.S. Provisional Patent Application Serial No. 60/047,285, filed May 21, 1997.

BACKGROUND OF THE INVENTION

The present invention relates to a scoop for sifting cat litter for the removal of waste therefrom. Approximately thirty to thirty-five percent of U.S. and European households have pet cats, the great majority of which live inside the home virtually as members of the family. The bathroom needs of these pet cats are typically accommodated by the "litter box", usually a plastic tray into which absorbent granulated clay litter is placed. The cats use the clay litter for elimination and covering of waste. Absorbent clay litter is the predominant material chosen by consumers for their litter boxes. It is readily available in all manner of retail outlets from the local supermarket to the pet shop.

Over the last 5 to 6 years, a new kind of clay litter has captured about forty to fifty percent of this absorbent clay cat litter market. This new clay litter is usually called "clumping" cat litter. It is typically made with clay of the bentonite variety. This kind of clay litter offers the unique feature of quickly forming durable "clumps" when wetted, as when a cat urinates upon it. These "clumps" are, on average, about the size of a flattened golf ball from a single cat urination. The clumps "set up" very quickly and become solid within about thirty seconds. These solid clumps are easily removed, leaving the rest of the litter bed clean and fresh. The result is better odor control, reduced quantities of litter used, and a more sanitary litter bed for the cats to use. It is usually necessary to scoop the litter pan twice daily.

Clumping litters vary in the strength of the clumps formed. Many form clumps that can break apart into smaller pieces. Houses with multiple cats can experience clump breakage because of cats walking on the clumps, disturbing the clumps when digging to cover a fresh elimination, or clumps may break up when being lifted out of the litter with a litter scoop.

The typical litter scoop in common use is a molded, plastic, slotted scoop with a handle. The scoop portion typically measures about four inches to five inches square or rectangular and has retaining side walls on the rear and the two sides. The side walls are typically one inch high. The front of the scoop is open. Both the bottom and the side walls are perforated with slots which make the scoop approximately fifty percent permeable to typical granulated clay cat litter. These slots allow the cat litter to sift through the bottom and the sides of the scoop and to fall back into the litter bed. Waste matter and clumps remain inside the scoop so they can be moved away from the litter box to a trash or waste receptacle. The slots in the typical litter scoop which allow for sifting of litter are typically long rectangular openings and the plastic grid structure elements which form the slots are typically rectangular in cross section. The slots are generally parallel and are oriented in the direction of the motion of the scooping action. The slotted bottom of the litter scoop may be flat, or it may be arcuate so as to conform to the arcuate motion typically used in the scooping of litter.

Typically, a cat litter pan will contain two to three inches of clay cat litter or clumping clay cat litter. Scooping out solid waste and/or clumps formed by clumping litter most typically requires a four step scooping action by the cat owner. First, one must insert the scoop into the cat litter and push the front end of the scoop down into the litter until it reaches the bottom of the litter pan. Then, one must push the scoop forward in and through the litter until the litter scoop is full. This action brings solid waste and/or clumps into the scoop. The fill scoop is then lifted upwardly, above the surface of the litter bed and tilted backwardly so that clumps or solid waste do not tumble off the front of the scoop. Finally, the scoop is jiggled and shaken so that the smaller litter particles in the scoop will fall back into the litter pan, leaving only clumps or solid waste in the litter scoop. The jiggling and shaking continues until no litter is left perched atop the slot grid members.

To provide a thorough litter box cleaning with the new clumping litters, it is necessary to sift through a large quantity of unsoiled litter to remove the clumped soiled litter. Consequently, a considerable amount of vigorous sifting action is required which is difficult for older cat owners and persons suffering from arthritis or other joint problems. It would be very beneficial if a cat litter scoop could be developed which made this task easier. The scoop of the present invention achieves this result.

SUMMARY OF THE INVENTION

Briefly, the present invention comprises a cat litter scoop with a battery powered vibrating mechanism carried in the scoop handle which is readily activated by a thumb operated switch. Upon activation, the vibrator imparts a high speed oscillation movement to the handle and the scoop portion of the device carried by the handle. The vibration is about the longitudinal axis of the handle, accelerating the manual steps associated with the conventional manual scooping motion: insertion, pushing, lifting and sifting. The scoop portion of the device is also configured to facilitate the passage of non-soiled litter therethrough. The result is a substantial savings in time and energy in the removal of soiled litter from a cat litter box.

It is the principal object of the present invention to provide an improved cat litter scoop particularly adapted for easing the task of removing soiled litter from a cat litter box employing clumping type cat litter.

It is another object of the present invention to provide a cat litter scoop which facilitates the passage of unsoiled litter therethrough during sifting to minimize the spillage of litter onto the floor when the scoop is moved away from the litter pan towards the waste receptacle.

It is yet another object of the present invention to provide a cat litter scoop having a vibrating mechanism therein for imparting an oscillatory movement to the scoop portion of the device to facilitate the removal of soiled litter which is of simple construction and economical to manufacture.

These and other objects and advantages of the present invention will become readily apparent from the following description taken in conjunction with the accompanying drawings.

BRIEF DESCRIPTION OF THE DRAWINGS

FIG. 2 is a top plan view of the litter scoop of the present invention.

FIG. 4 is a perspective view of the vibrator mechanism employed in the present invention.

DESCRIPTION OF THE PREFERRED EMBODIMENT

Figure 1:
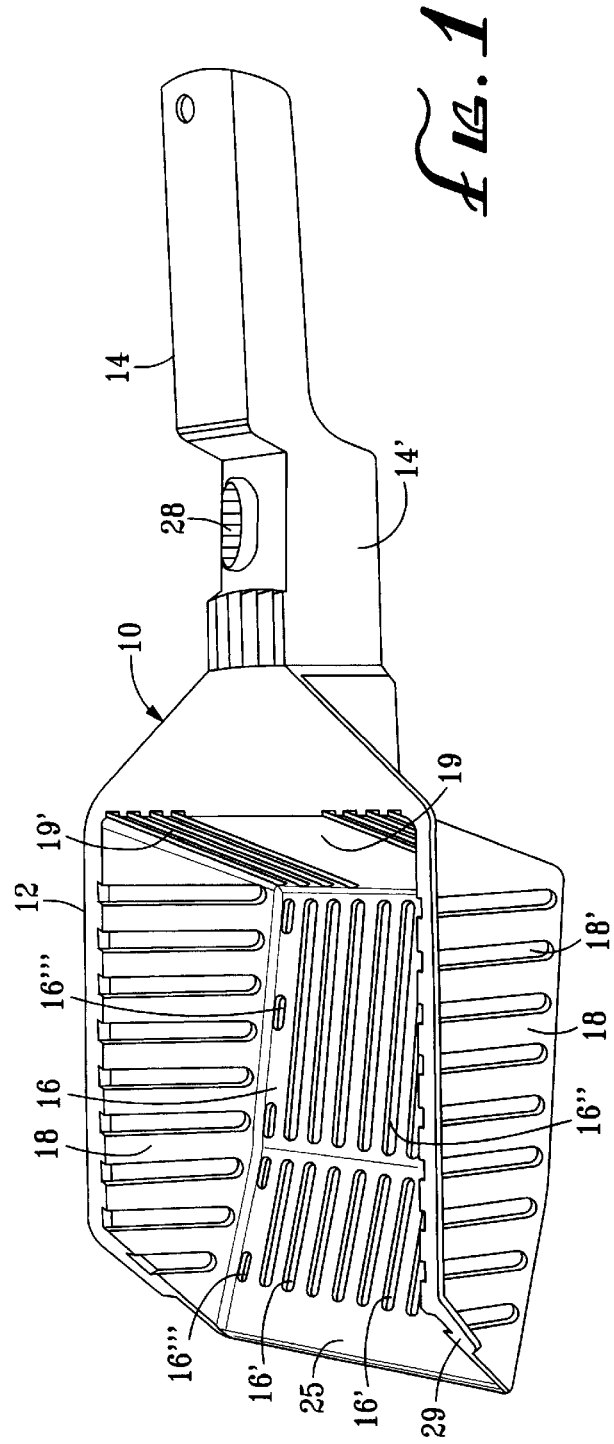
FIG. 1 is a perspective view of the litter scoop of the present invention.
Figure 3:
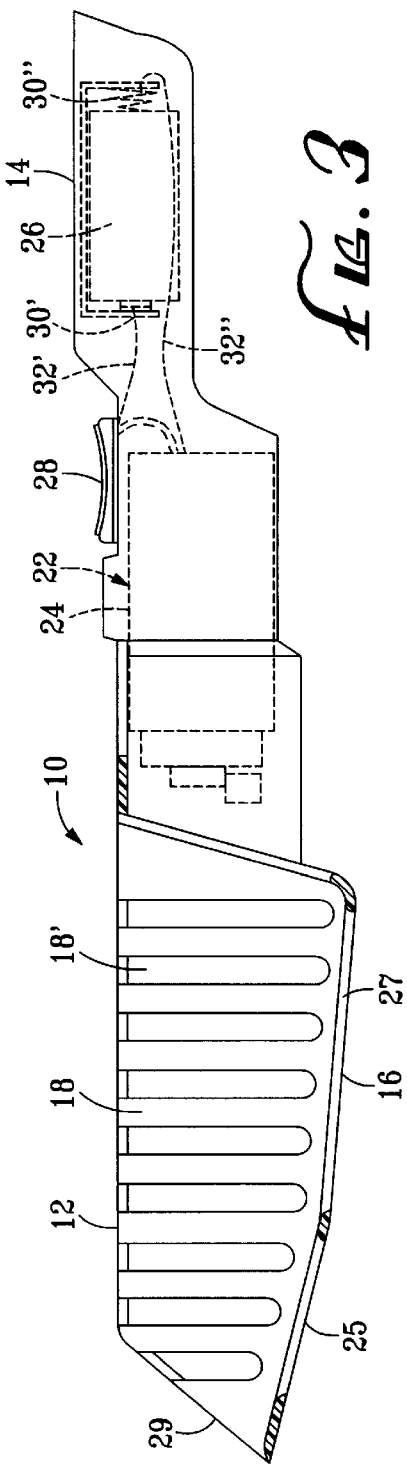
FIG. 3 is a sectional view taken along the line 3—3 in FIG. 2.

The litter scoop device 10 of the present invention is preferably formed of molded plastic and comprises a forward scoop portion 12 and a handle portion 14. The forward scoop portion 12 is defined by a slotted bottom wall 16 and slotted side walls 18 and a slotted rear wall 19 which project upwardly from the bottom wall 16. The bottom wall 16 defines a plurality of parallel longitudinal slots therein. These slots can be arranged in a variety of configurations. In the preferred configuration illustrated in FIG. 1, the bottom wall 16 defines a forwardly disposed transverse row of longitudinally extending parallel slots 16', a second transverse row of longitudinally extending parallel slots 16" and a plurality of aligned slots 16'" laterally spaced from the rows of slots 16' and 16".

As seen in FIG. 2, elongated slots 16" are greater in length than 16' so as to define a solid transverse web 21 extending across the scoop bottom wall 16 forwardly of the midpoint thereof to enhance the structural integrity of the scoop portion 12. The outermost lateral slots 16'" are further reduced in length to provide solid sections 23 therebetween and adjacent the scoop side walls 18 to further enhance the structural integrity of the device. The upstanding side walls 18 and rear wall 19 are provided with a plurality of vertically disposed slots 18' and 19', respectively. Slots 19' are positioned on opposed lateral sides on a centrally disposed solid wall portion 19" for additional structural strength at the juncture of the handle and scoop portions of the device.

In the preferred construction of scoop portion 12, the bottom wall 16 is separated by web 21 into a forward portion 25 and rearward portion 27. Portion 27 is inclined upwardly with respect to a central longitudinal axis passing through the handle portion 14 of the device 10 at an angle of about 5°. The forward portion 25 of bottom wall 16 is inclined upwardly from said axis at an angle of about 15°. The forward edge 29 of side walls 18 is inclined rearwardly at an angle of about 40° with respect to a vertical axis passing therethrough. As seen in FIG. 2, the upper edges of slots 16', 16" and 16'" in bottom wall 16 are radiused to facilitate the passage of the small unsoiled litter particles through the slots to minimize spillage on to the floor when the scoop is moved from the litter pan to the wash receptacle. While other scoop and slot configurations can be employed, the above described configurations are both highly effective in sifting waste from the litter while providing the scoop portion of the device with strong structural integrity.

The handle portion 14 of the litter scoop device 10 is hollow so as to define a housing for the vibrating mechanism 22. The lower end of the handle is preferably open to allow for the insertion of the vibrating mechanism 22 and a cover (not shown) is removably attached to the handle so as to fully encase the vibrating mechanism while defining a lower surface for the handle portion 14.

The vibrating mechanism 22 comprises a DC motor 24, a battery 26, preferably an AA battery, and a push button on/off switch 28 which projects through the upper surface of the handle and is disposed at the "thumb" position to facilitate movement between the on and off positions. The switch may be provided with high and low speed settings. The battery 26 is held between contact members 30' and 30" which are in electrical communication with DC motor 24 via leads 32' and 32". An eccentrically mounted weight 34, preferably formed of lead, is mounted on the motor shaft 36 as seen in FIG. 2. Shaft 36 is substantially coincident with the central axis of the handle portion 14. Motor 24 is rigidly affixed within an enlarged portion 14' of handle 14 and is disposed adjacent the interior handle walls of the scoop such that vibration of the motor 14 is transmitted to the handle portion 14 and thus scoop 10.

Upon moving the switch 28 to the on position, DC motor 24 electrically communicates with the battery power source 26 causing rotation of shaft 36. The off center mounting of weight 34 on shaft 36 causes vibration of the motor 24 and of the entire scoop 10 in the nature of an oscillatory motion about the longitudinal axis of the handle. As the forward portion of the scoop 12 is caused to vibrate, the finer unsoiled litter particles will pass through the various slots in scoop portion 12, leaving only the soiled "clumps" remaining within the scoop portion 12 for easy disposal.

In an alternate embodiment of the invention, the litter scoop 10 may incorporate a modular design for the DC motor 24, switch 28, battery 26, contacts 30' and 30" and wires 32' and 32". In such a configuration these components could all be self contained in a modular unit which would be readily snapped into and out of the handle portion of the scoop. Such a configuration would allow for the scoop to be completely washed if desired by the cat owner after removing the vibrating unit so that there would be no damage to the vibrating unit.

Various other changes and modifications could be made in carrying out the present invention without departing from the spirit and scope thereof. Insofar as those changes and modifications are within the purview of the appended claims, they are to be considered as part of the present invention.

I claim:

1. A cat litter scoop comprising a handle portion and a scoop portion carried by said handle portion, said scoop portion defining an open forward end, a bottom wall, a pair of opposed side walls and a rear wall, said bottom wall defining a plurality of spaced openings therein, said handle portion defining a housing, a battery powered vibrator mounted within said housing for effecting selective vibration of said scoop portion of said cat litter scoop and a switch member carried by said handle portion for activating said vibrator.

2. The cat litter scoop of claim 1 wherein said handle portion defines a longitudinal axis extending therethrough and said vibrator imparts oscillatory motion about said longitudinal axis to said scoop portion of said litter scoop.

3. The cat litter scoop of claim 1 including openings in said side and rear walls of said scoop portion and wherein said openings in said bottom wall comprise a first row of elongated longitudinal slots disposed transversing said scoop portion proximate said forward end thereof, a second row of elongated longitudinal slots transversing said scoop portion rearwardly of said first row so as to define a solid web therebetween and a plurality of openings disposed laterally of said first and second rows of slots.

4. The cat litter scoop of claim 3 wherein said vibrator comprises a DC motor, a rotatable shaft extending therefrom and a weight member eccentrically mounted on said shaft for imparting oscillatory motion to said handle and scoop portions of said cat litter scoop.

* * * * *